US005799317A

United States Patent [19]
He et al.

[11] Patent Number: 5,799,317
[45] Date of Patent: Aug. 25, 1998

[54] DATA MANAGEMENT SYSTEM FOR A TELECOMMUNICATIONS SIGNALING SYSTEM 7(SS#7)

[75] Inventors: Jingsha He, Plano, Tex.; Yi-Shang Shen, Potomac, Md.

[73] Assignee: MCI Communications Corporation, Washington, D.C.

[21] Appl. No.: 555,422

[22] Filed: Nov. 8, 1995

[51] Int. Cl.$^6$ ................................................ G06F 17/30
[52] U.S. Cl. ..................... 707/104; 370/410; 370/426; 379/230
[58] Field of Search ..................... 395/615; 379/230; 370/410, 426

[56] References Cited

U.S. PATENT DOCUMENTS

| | | | |
|---|---|---|---|
| 4,499,336 | 2/1985 | Krikor et al. | 379/230 |
| 4,972,453 | 11/1990 | Daniel, III et al. | 379/10 |
| 5,437,009 | 7/1995 | Lane | 395/349 |
| 5,438,570 | 8/1995 | Karras et al. | 370/426 |
| 5,469,498 | 11/1995 | Abe et al. | 379/127 |
| 5,475,732 | 12/1995 | Pester, III | 379/34 |
| 5,535,200 | 7/1996 | Gardner | 370/410 |
| 5,563,930 | 10/1996 | Pester, III | 379/34 |
| 5,581,610 | 12/1996 | Hooshari | 379/133 |

OTHER PUBLICATIONS

Modarressi et al., "Signaling System No. 7: A Tutorial", IEEE Communications Magazine, vol. 28 No. 7, Jul., 1990, pp. 19–20, 22–35.

Jabbari, B., "Common Channel Signaling System No. 7 for ISDN and Intelligent Networks", Proceedings of the IEEE, vol. 79, No. 2, Feb., 1991, pp. 155–169.

Mondrressi et al., "An Overview of Signaling System #7", Proceedings of the IEEE, vol. 80, No. 4, Apr., 1992, pp. 590–606.

*Primary Examiner*—Paul R. Lintz

[57] ABSTRACT

A data management system is connected to a Signaling System 7 telecommunications network (SS#7). Network elements and other data sources of the SS#7 network provide alarm data to the management system when problems occur with the network. The data management system includes a database library that classifies the problem and provides prioritized resolutions, based on past historical events. The library continues to expand with data each time an alarm is resolved. Data from the network elements are also stored for generation of reports, such as those dealing with configuration, performance, faults, and security.

11 Claims, 3 Drawing Sheets

DATA MANAGEMENT SYSTEM FOR A TELECOMMUNICATIONS SIGNALING SYSTEM 7(SS#7)

FIELD OF THE INVENTION

The present invention relates to the monitoring of network elements in a telecommunication system, and more particularly to a database management system that collects monitoring alarm data and compares it to historical profile data that provides potential resolution.

BACKGROUND OF THE INVENTION

All phone systems need signalling. According to Henry James, author of the *Dow Jones-Irwin Handbook of Telecommunications*, signals have three basic functions:

1. Supervising. Monitoring the status of a line or a system to see if it is busy, idle or requesting service. Supervision is a term derived from the job telephone operators perform in manually monitoring circuits on a switchboard. On switchboards, supervisory signals are shown by a lit lamp indicating a request for service on an incoming line or an on-hook condition of a switchboard cord circuit. In the network (i.e., the automated part of the network), supervisory signals are indicated by the voltage level on signaling leads, or the on-hook/off-hook status of signalling tones or bits.

2. Alerting. Indicates the arrival of an incoming call. Alerting signals are bells, buzzers, woofers, tones, strobes and lights.

3. Addressing. Transmitting routing and destination signals over the network. Addressing signals are in the form of dial pulses, tone pulses or data pulses over loops, trunks and signalling networks.

Until recently, signalling was MF (multi-frequency) and SF (single frequency) and is inband. This means that is goes along and occupies the same circuits as those which carry voice conversations. There are two problems with this. First, about 35% of all toll calls are not completed because the phone does not answer or is busy, or there are equipment problems along the way. The circuit time used in signalling is substantial, expensive and wasteful. Second, inband signalling is vulnerable to fraud. So the idea of out-of-band signalling came about. It got the name of Common Channel Signaling (CCS) because it used a communications network totally separate from the switched voice network. In North America, CCS started out as a packet switched network. It was named Common Channel Interoffice Signaling (CCIS) network by AT&T that was operating at 4800 bits per second link speed. Each of the packet switches in this network are called Signal Transfer Points—STPs. CCIS is AT&T's proprietary version of CCITT Signaling System 6 (CCS6). It has the following advantages over SF/MF signalling:

Baud is reduced. "Talk-off" is reduced. (Talk-off occurs when your voice contains enough 2600 Hz energy to activate the tone-detecting circuits in the central office.) Signalling is faster allowing circuits and conversations to be set up and torn down (i.e., disconnected) faster. Signals can be sent in both directions simultaneously and during voice conversation if necessary. Network management information is routed over the CCIS network. For example, when trunks fail, switching systems can be told with CCIS data messages to reroute traffic around problem areas.

The older CCIS signalling is being replaced with a newer out-of-band signalling system called Common Channel Signaling System 7 (CCS7). Networks in North America implemented a version of CCS7 that was approved by the American National Standard Institute (ANSI). ANSI CCS7 is closely aligned with the CCITT Signaling System 7 which is being deployed by telecommunications administrations worldwide (i.e., all the local country-owned telephone companies) for their networks. This new protocol uses destination point code or global title routing, octet or bit oriented fields, variable length messages and a maximum message length allowing for 256 bytes or more of data. Addition of flow control, connection less services and Integrated Services Digital Network (ISDN) capabilities supported by CCS7 were approved by CCITT in 1984. A major characteristic of CCITT Signaling System #7 is its layered functional structure. Its transport functions are divided into four levels, three of which constitute the Message Transfer Part (MTP). The fourth consists of a common Signaling Connection Control Part (SCCP).

The SS#7 protocol consists of four basic sub-protocols:

Message Transfer Part (MTP), which provides functions for basic routing and flow control of signaling messages between signaling points.

Signaling Connection Control Part (SCCP), which provides additional routing and management functions for transfer of messages other than call setup between signaling points.

Integrated Services Digital Network User Part (ISUP), which facilitates signaling support for circuit-related services. This signaling support includes call setup, tear down, circuit continuity check, etc.

Transaction Capabilities Application Part (TCAP), which provides for transfer of non-circuit related information between signaling points.

Signal System 7 provides two major capabilities:

1. Fast call setup, via high-speed circuit-switched connections.

2. Transaction capabilities which deal with remote data base interactions. What this means in its simplest terms and in one simple application is that Signaling System 7 information can tell the service provider whether the call is allowed, how the call should be treated and tell the called party who's calling, and, more important, tell the called party's computer.

Advances in telecommunications technology present a great challenge to service carrier companies. On one hand, these companies have to continuously upgrade their network infrastructure to keep up with the technological advances, to provide more advanced services to consumers, and to improve upon the quality of existing services. In essence, they have to try every effort to ensure success in the fierce competition of the huge and lucrative telecommunications market. On the other hand, inter operability and compatibility between telecommunications equipment that offers services of different kinds and at different levels of quality as well as that between local exchange carriers (LECs) and interexchange carriers (IXCs) make the management of the signaling as well as the switching network a task with an unprecedented level of difficulty and complexity. Not only does an effective and efficient means of network management add to the assurance that the complex network is running as desired to achieve a high degree of reliability and resource utilization, but it also contributes to the planning of future network growth and upgrade based on the present working characteristics of various network elements.

Network management is generally concerned with five areas: fault, performance, configuration, accounting, and security. Fault management provides the means to identify network element failures and to help resolve network problems. Performance management provides the means to monitor traffic between network elements and to help identify network traffic bottlenecks. Configuration management provides the means to maintain the operating parameters of network elements and to reconfigure individual elements at system recovery from network failures. Accounting management provides the means to calculate the expenses of running the network and to allocate the expenses to responsible parties. Security management provides the means to control accesses to use the network and to identify internal and external threats to the safety of the network. Few current network management systems and applications provide full functionality that covers all five areas, however. Furthermore, few provide the flexibility to expand problem coverage as the network grows by adding additional network elements and/or by upgrading the existing network elements. There exists a big gap in sophistication between networks that are currently in operation and network management systems that govern the networks. Lack of effective and efficient network management costs telecommunications companies millions of dollars each year due to network failures that could have been prevented should the problems be captured early and necessary means be taken to correct the problems, due to unnecessary expenditures that are caused by poor and inadequate planning on future network growth, and due to telecommunications fraud without appropriate network security measures against internal and external threats.

Rapid technological advances in telecommunications industry have greatly enhanced the level and the quality of telecommunications services that are offered to consumers. However, the lack of hardware compatibility and effective software control systems leaves a lot of run-time operational problems that can only be handled real time by the network control systems or network management systems. Unfortunately, most of the current network management systems supplied by hardware equipment vendors and/or software companies are only capable of handling a fixed and limited set of known problems that have been clearly specified during product design and manufacturing. If a problem occurs in the network but falls out of the product specifications, the problem may not be recognized or it may be ignored by the underlying management system. The consequence due to the undermanagement can be devastating and very costly because it directly threatens the availability, reliability, and quality of telecommunications services to consumers.

Network elements (switches, STPs, etc.) that are manufactured by different vendors may not be fully compatible with one another due to implementation limitations and due to the lack of a uniform interpretation of some international standards. Neither are the network management systems that are developed for these network elements by these vendors or by third-party software companies. This incompatibility eventually causes network problems in the interactions between LECs and IXCs even if each carrier company may have developed a common specification across its own entire platform of switching and signaling networks. These interactions are unavoidable because IXCs have to rely on LECs to complete voice and data transmissions and LECs have to rely on IXCs to transmit voice and data out of the local access and transport areas (LATAs) they cover for services.

Due to the lack of full compatibility between network elements of LECs and those of IXCs, there is a grey area where certain messages and alarms or certain sequences of messages and alarms passed over from, say, an LEC to an IXC cannot be recognized by the management system of the IXC, and vice versa. These massages and alarms may indicate problems that have happened in the network of the LEC and that might eventually affect the normal network operations of the IXC. They may even indicate problems that have already happened in the network of the IXC but, nevertheless, have not been discovered by the network management system of the IXC. However, such messages and alarms are usually ignored if they cannot be recognized by the network management system. Typically, they result in the network elements in the LEC's network and those in the IXC's network residing in an inconsistent state that can usually be corrected by a simple synchronization function initiated by either side of the network elements involved.

LECs handle a lot of requests from IXCs for services they receive. For example, IXCs need LECs to reach customers and, in many cases, rely on LECs to collect bills for the toll services they provide. But each LEC handles requests from the IXCs differently and, therefore, IXCs cannot rely on individual LECs to provide a uniform service to their requests. Since the same request from an IXC to different LECs may get different responses, the handling of the responses from different LECs may need to be dealt with differently. Furthermore, unilateral hardware and software upgrade on the LEC side requires that the network management system of the IXCs be flexible enough in order to be able to maintain its functionality in such a dynamic environment.

Most network management systems nowadays detect and report merely local network problems that are constrained by design specifications. When a network event occurs, a flood of alarm messages may be generated and sent to the network management center if the status of the event persists. Moreover, more than one network node could be affected by this single event. In this case, the detection of this event may result in all the affected nodes to generate their own version of alarms and to send the different alarm messages to the network management center. These alarm messages fill up the network management console quickly and cause a great deal of difficulty for the network support staff to effectively and efficiently diagnose the network problems that triggered the alarms. This situation is further complicated if the communications systems at the affected nodes are supplied by different manufacturers or vendors because the alarms generated by different nodes for the identical event may not consistently convey the same nature of the problem. Therefore, a network management system must have the intelligence to analyze the alarm messages that arrive at the network management center in order to filter out the redundant alarm messages that result from the same network event and to recognize and unify alarm messages from different sources and network nodes. The ultimate goal of the intelligent analysis is to present to the system support staff the accurate nature of the network problems along with the proper actions to take in order to resolve the network problems.

BRIEF DESCRIPTION OF THE PRESENT INVENTION

The present data management system (hereinafter the S7DM) intends to address the complex issue of building a flexible and dynamic network management platform upon which sophisticated network management functions can be implemented for telecommunication networks such as MCI. In the center of the S7DM lies a problem/resolution library (PR library) that provides the foundation for S7DM to respond to the constantly changing needs of network management.

The problems previously discussed regarding incompatibility of network elements, along with the resolutions can be easily documented in the PR library so the S7DM is able to pick up messages and alarms and proceed with the necessary steps to resolve the problems with or without the cooperation from an LEC. From then on, these messages and alarms are no longer unrecognizable and corresponding resolutions are known and readily available to correct future occurrence of the same network problems.

S7DM, at present, is implemented as a client-server application software that runs at the application layer of the OSI model. That is, S7DM will rely on other communications protocols such as SNMP and TCP/IP to connect the server and the clients in order to carry out real-time communication between them. However, the disclosed invention can be implemented under any hardware/software platform with a variety of protocols and applications. Besides the PR library, the server also maintains a central relational database for storing collected network data that are necessary to perform network management analysis tasks and to perform data processing and analysis work to reach desired management decisions. S7DM takes most of its input data from conventional signaling system #7 (hereinafter SS#7) network components and Protocol Monitoring Units (PMUs) that have been deployed in MCI's SS#7 network as independent external monitoring systems and stores them in the central relational database. S7DM will also be connected to other legacy network management systems that are still in operation to take necessary data to help S7DM achieve its network management goals. These systems might have been specifically developed to perform functions in certain areas of network data management such as configuration management and accounting management. Data that arrive at S7DM and those that have been previously collected and stored in the relational database will be analyzed for discovering network problems, for reporting network performance statistics, and for unveiling potential security threats to network elements in the SS#7 network. S7DM can be used as the foundation for a new generation of data management platforms where advanced network management functions can be implemented such as network problem diagnosis and network maintenance, intelligent message routing and rerouting, future network traffic and performance prediction, automatic network recovery and reconfiguration, and effective security control of network accesses and usages.

The primary objective of the present invention is to develop a network data management platform (S7DM) for the SS#7 network that is capable of monitoring a large number of network events dynamically to support the implementation of a wide variety of network management functions in the areas of fault management, performance management, configuration management, accounting management, and security management. Not only should S7DM provide the management capability to a large number of events, but it should also achieve a high performance in supporting the management of the events. The key to achieve this objective relies on a flexible and dynamic system structure and software architecture and design.

The S7DM uses various data sources, including those monitored internally and externally of network nodes, to predict and manage the behavior of a SS#7 network. Thus, it can provide a reliable diagnosis when the network is in trouble. Many of the existing network management systems rely on the alarms and trouble reports sent by systems in trouble in order to conduct network diagnosis and maintenance activities. Experience indicates that such alarms and reports are either incomplete or not available when the network experiences major outages.

The S7DM system is designed to be flexible enough to work with data produced by any network management systems. Thus, it is most suitable for a network with multiple equipment/system vendors, such as the MCI SS#7 network.

The S7DM platform provides time synchronization for all the network management and monitoring systems. When a network event occurs, alarms and reports are generated by many sources, possibly in different formats and priorities. The S7DM system will synchronize all the alarms and reports, and then consult the rule library before producing its own alarms. These alarms generated by the S7DM system convey the precise events and problem locations that require network operator/engineer's attention.

The S7DM system manages both the event-driven alarms/warnings and the network performance statistics/reports. Thus, it is capable of predicting network behavior and generating "soft alarms" (such as the load level exceeding a certain threshold or the queue length is longer than a certain limit) which most of the existing network management tools cannot do.

The S7DM platform allows centralized control of the contents of reports, reporting frequencies, types of alarms, etc. to be sent by each individual network component. Reports generated by the S7DM system are tailored to each network user's needs as well.

The problem/resolution (PR) library in the S7DM platform stores all the SS#7 network problems the network has ever experienced. Information stored in the database includes the problem characteristics, alarm sequences/patterns, problem locations and frequencies, associated hardware/software versions, customer and network impacts, and the specific activities that resolved the problems. When an alarm is generated by the S7DM system, it will journal the event and check with the PR library. If the network event is already recorded in the library, it will inform the operator or engineer on the event occurring, frequency in the past and the activities that resolve the same event in the likelihood order. Thus, the longer the S7DM system is used, the more sophisticated it becomes.

When the PR library stores enough records, the S7DM system will be able to predict the network problems by comparing event patterns and perform pro-active network management before the problem even occurs.

The S7DM system is capable of activating a "fire-fighting" mode data gathering on each network node or signalling link/linkset. Under "fire-fighting" mode, the monitoring devices record every SS#7 transaction between two network nodes or using the selected link/linkset. When the anticipated network problem does occur, this information will help in recreating the event in a controlled environment and pin-point the source of the problem. This capability is particularly useful for a network with multiple system vendors.

The S7DM system provides interfaces to network configuration systems, network provisioning systems, transmission routing databases, network restoration systems, etc. Thus, it has the unique capability to determine the factors such as network redundancy and routing diversity that are used for predicting network reliabilities and availabilities. With this capability, the S7DM system can provide network engineers with guidelines on SS#7 network reconfiguration.

The S7DM platform can not only manage performance and configuration of SS#7 network components, it is also capable of managing performance by service types (e.g., VNET, 800, 900, 1+, Credit Card Call). It offers this capability since the S7DM can easily decode SS#7 messages and select the desired service types or parameters to monitor and report.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
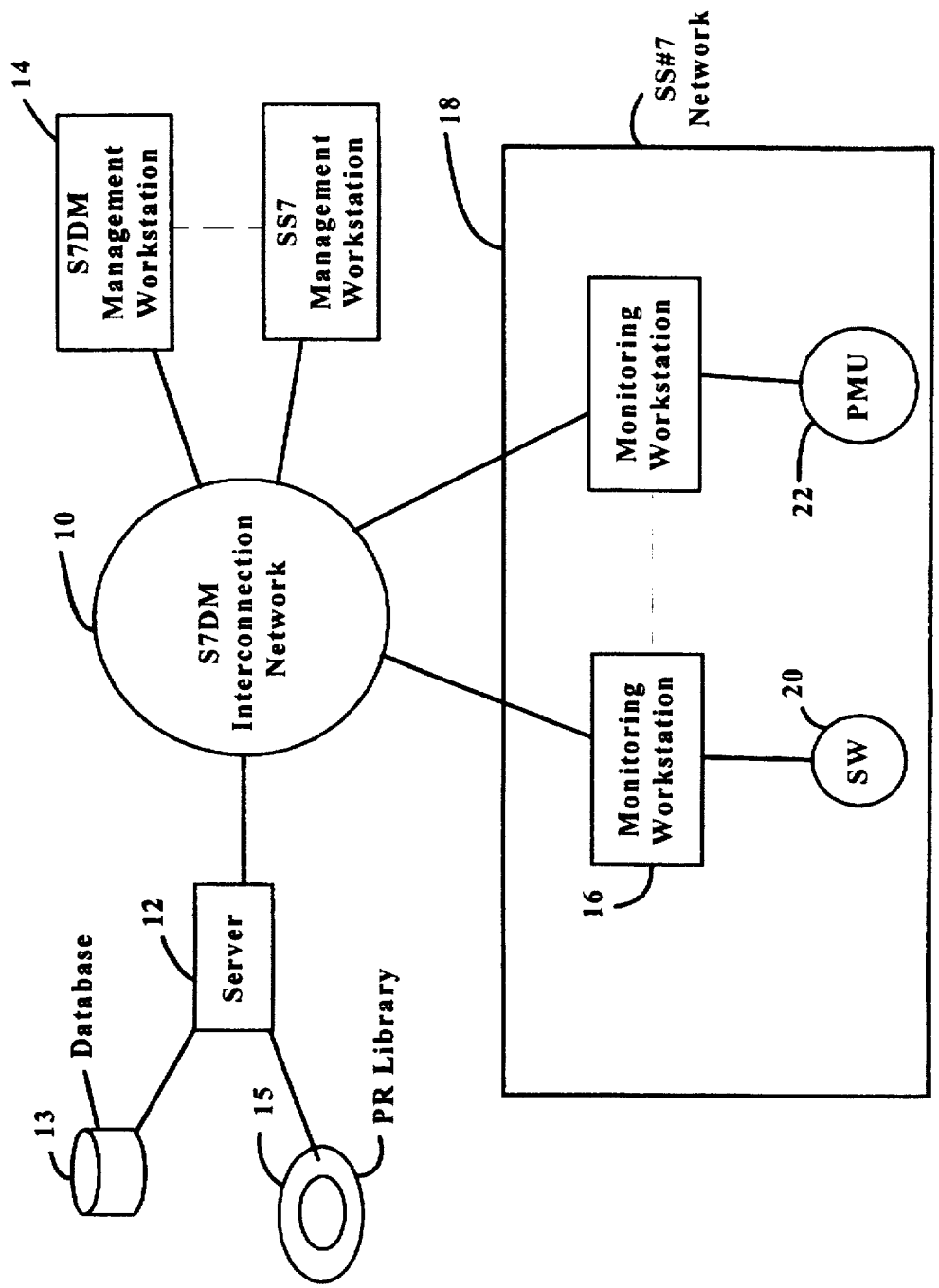
FIG. 1 is a block diagram of the basic architecture of the present invention.

FIG. 1 shows three types of nodes identified in the S7DM management environment interconnected through either a public or a private communications network: They are the server or processor node 12, the management station node 14, and the monitoring node 16. A node in S7DM is a computer or a workstation that runs a part of S7DM software to accomplish the set of distinguished tasks it is configured to accomplish. However, these nodes run in cooperation with each other to perform the desired network management functions of S7DM. The three types of nodes as well as their interconnection is illustrated in FIG. 1.

The server 12 node maintains a central relational database 13 where all the source data from the monitoring nodes are stored. It also maintains the PR library 15 where network problem events to be monitored by the monitoring nodes are documented along with resolutions to the problems if available. The PR library is logically separate from the central database. Data in the PR library may be sequentially stored in a flat file or organized in a separate relational database. Technically, there is no problem to combine the PR library together with the central relational database. However, in terms of achieving a desired high performance, separation would allow the storage and retrieval of problems and resolutions to be conducted much faster because the PR library will be a relatively small database compared to the central database. Other than maintaining the databases, the server node is also the place where most of the data processing work takes place. They include, but not limited to, database queries, alarm data and performance report collection and processing, problem resolution initiation and dispatching, system configuration and maintenance, and system administration.

There are a number of active client nodes called management stations 14 to the server 12 in S7DM. Management stations are the interface between the system administrator and between the network support staff and the S7DM for maintaining S7DM and for maintaining the SS#7 network 18, respectively. The functions of the S7DM system administrator include system and database installation, configuration and maintenance, user account management, and monitoring event and resolution validation, etc. The role of the S7DM support staff is to operate the S7DM for the purpose of supporting and maintaining the SS#7 network. The server node can also function as a management station with the installation of proper software to achieve this functionality. This makes the server machine both a database server and a database client for the S7DM system administrator as well as for the S7DM support staff members.

There are a number of passive client nodes called monitoring nodes 16 to the server node in S7DM. The monitoring nodes are typically computers or workstations installed at network elements (e.g., switches 20 and protocol monitoring units —PMUs 22) in the SS#7 network to monitor problems and traffic going into and out of the elements as desired and to forward alarm and performance data generated in correspondence to problems and traffic in the SS#7 network to the S7DM server for storage and processing. These nodes can be dynamically configured by the S7DM system administrator for collecting, filtering, and forwarding specified alarms and performance data to the S7DM server. These nodes may also be called agent nodes because they play the role of the agents for the S7DM server in the SS#7 network to perform specified tasks.

Software Architecture

Figure 2:
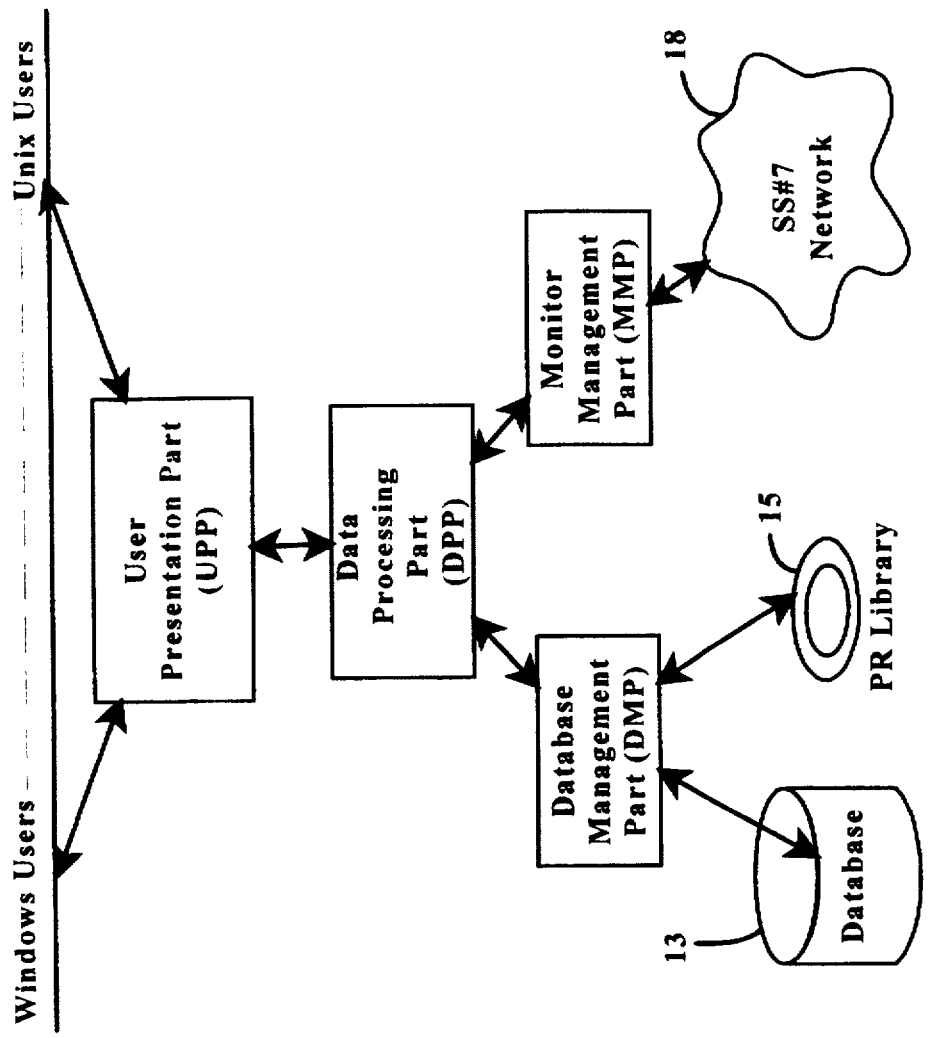
FIG. 2 is a block diagram of the software structure of the present invention.

The software structure of S7DM is depicted in FIG. 2. The system consists of four major functional components. User Presentation Part (UPP) interfaces the users, i.e., the system administrator, the system support staff and regular users of S7DM, with the database server 12 and with the monitoring nodes 16 that are deployed in the SS#7 network 18. Its main functionality includes the presentation of various alarm and data reports to the users and the interpretation of user requests to direct database and network operations. The UPP software is running on the management workstations 14 and on the server 12 and can be tailored to suit different execution environments, e.g., Windows, X-windows, DOS, etc., for managing and supporting S7DM and the SS#7 network. It is also the interface for the S7DM system administrator to administer and configure the individual components of S7DM.

The Data Processing Part (DPP) is the most important component of S7DM because this is where all the major data processing and decision making functions in S7DM take place. The DPP software is running on the server 12 to serve all the user requests from the system administrator, from the system support staff, and from regular users.

Database Management Part (DMP) manages the database where all the data necessary for managing the SS#7 network is stored. It also manages the PR library where network problems events to be monitored by S7DM and their resolutions are stored. The DMP also handle all requests from the DPP and from the Monitor Management Part (MMP). DMP provides the only means through which other components of the S7DM gain accesses to the S7DM database and to the PR library. The DMP resides on the server machine along with the central database and the PR library.

Monitor Management Part (MMP) is the component that carries out the actual monitoring functions for S7DM at the network elements to collect specified alarm and traffic data. After very limited processing and filtering, MMP sends the collected data to the server 12 for storage and for processing to achieve SS#7 management functions. After the data arrive at DPP, they will be processed and destined to various components of S7DM. If the data that arrive at the DPP indicate that an alarm has been raised in some monitored network elements, the PR library will be consulted for problem resolution and the alarm along with the resolutions will be forwarded to the designated management station 14 to inform the support staff of the problem and the possible resolutions to the problem. The alarm data will also be saved in the central database 13 and in the PR library 15 for accumulation of intelligence. If the data that arrive at the DPP contain regular traffic report, they will be directly stored in the central database for periodic processing by the DPP to generate performance reports for the system support staff.

A number of major operational activities inside S7DM will be discussed. The PR library serves as the profile for network problem event monitoring. After initial configuration, subsequent monitoring events are entered into the PR library by the system support staff but need to be validated by the system administrator before monitoring on these events can take place in the monitoring nodes. Alarms previously not in the PR library, and thus not currently supported by S7DM have nevertheless arrived at the monitoring nodes and can be transmitted to the server node for storage and processing and then sent to designated management stations to bring them to the attention of the system support staff. After thorough analyses, these alarms can be entered into the PR library along with possible ways of resolving the corresponding problems. Afterwards, proactive monitoring of these events can be carried out at the monitoring nodes.

An alarm that arrives at the monitoring nodes should be transmitted to the server machine. After processing by the data processing part of S7DM, the server 12 will forward the alarm to a system support staff member or a group of members at a management station 14 which is assigned the responsibility of resolving the network problems that have caused the alarm. The system support staff member will be provided with a list of possible ways of resolving the problems that are derived from the PR library 15 to aid the support staff member in fixing the problems. S7DM will also try to resolve network problems corresponding to an alarm automatically if the data derived from the PR library indicates that the causes to the problems are obvious and the resolution can be initiated automatically without human intervention. Typically, such problems can be fixed by re-synchronizing or resetting network elements by automatically starting the proper procedure. In this case, a report will be generated and sent to the system support staff for recording the activity. The level of automation that can be achieved depends on many factors, among which are the level of sophistication of S7DM and the level of complexity of the problems and their resolutions.

After a problem is resolved either automatically initiated by S7DM or by a field engineer, a report is filed with the responsible system support staff member who in turn will be responsible for entering the resolution into the PR library, a process of knowledge accumulation and intelligence enhancement for the PR library in S7DM. Again, the updated PR library needs to be validated by the system administrator before it can be used for pro-active event monitoring at the monitoring nodes.

Regular users can log into S7DM, issue queries for alarm data and performance reports, and communicate with the system administrator and the system support staff for providing additional services like monitoring new network events of their interests and responsibilities. In return, these users may be charged for the services that S7DM is requested to provide to them.

The most noticeable feature that distinguishes S7DM from and makes S7DM superior to other network management systems is its flexibility and scalability to support the monitoring of a number of network events. This is achieved through the use of the PR library as the dynamic configuration profile for the specification of network events that need to be monitored and documented. Network problems that have already been documented in the PR library help speed up the resolution process by offering possible causes to the problems. Network problems that do not exist in the PR library will be recorded in the PR library along with ways of resolving the problems entered by network engineers and technicians based on the actually resolving experience or based on previous experience on resolving similar problems. The PR library relieves network management from relying on human knowledge to resolve every instance of problems by automating the resolution-finding process. This is especially important if human intervention to resolve problems can be completely replaced by automatically starting certain defined procedures. This is possible whenever reconfiguration of certain network elements is all that is needed to resolve a problem alarm or to respond to poor network performance.

To support a flexible and scalable network management system like S7DM, the monitoring component must be able to be configured so that all alarms that have been raised in the monitored network elements will be sent to the S7DM server, even if they are not in the specification of the monitoring component. Or the monitoring component allows dynamic configuration as to what events need to be monitored along with the criteria or threshold values to filter alarms and events and send them to the S7DM server machine. Furthermore, this dynamic configuration should allow the use of wide card characters and strings to cover a wider range of network events than those that have been known and specified.

It should be understood that the invention is not limited to the exact details of construction shown and described herein for obvious modifications will occur to persons skilled in the art.

Flow Chart

Figure 3:
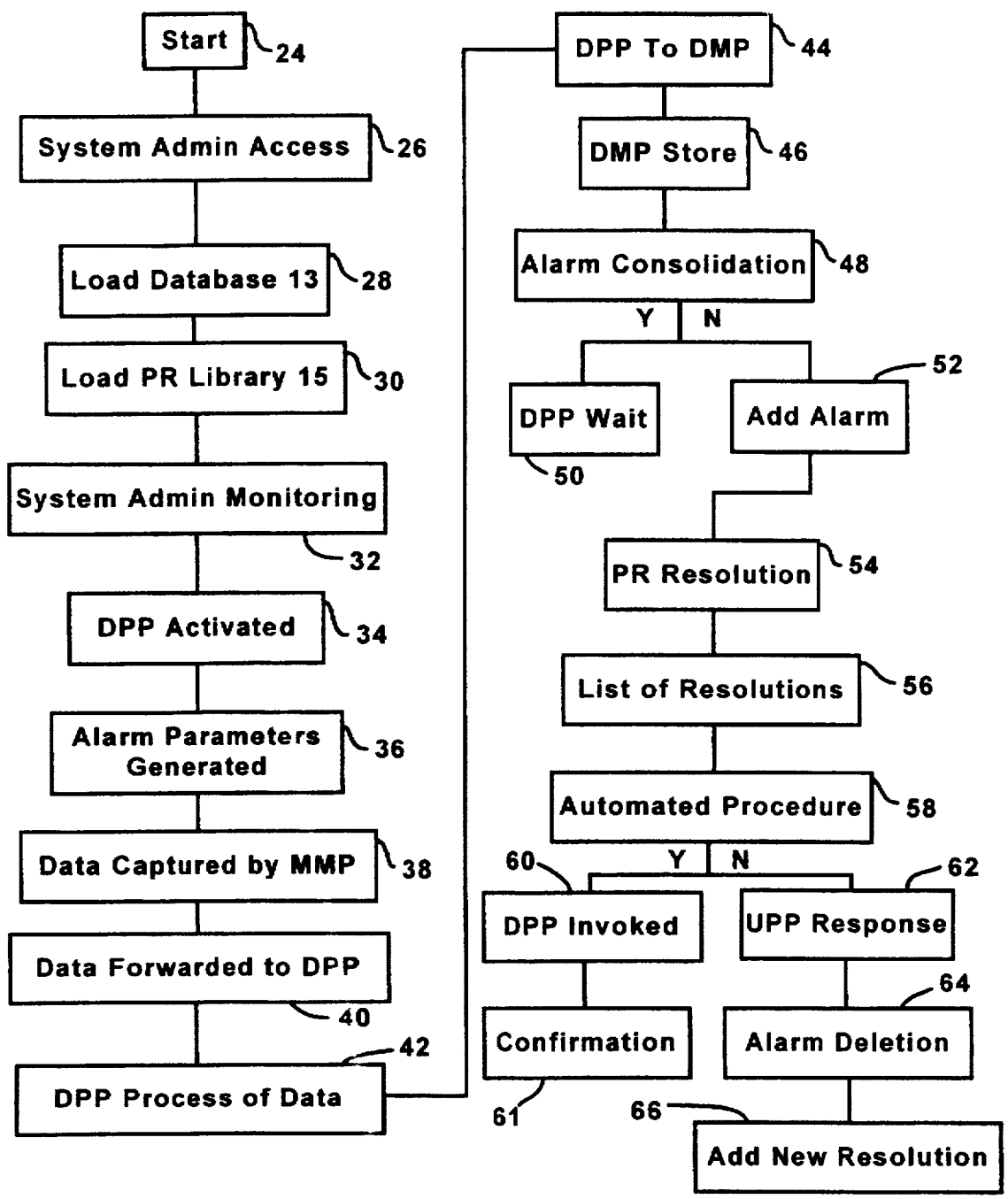
FIG. 3 is a flow chart of the invention.

FIG. 3 indicates the basic software flow chart for the present invention. The process starts at step 24. At step 26, a system administrator takes control of the operation using the server 12 or management workstation 14. In steps 28 and 30, an initial database and problem/resolution rules are loaded into S7DM 10 to initialize the central data repository in database 13 and the PR library 15, through the DMP.

During step 32, the system administrator turns on the events and network parameters to be monitored through the MMP. The occurrence of specified network events will trigger the generation of alarms that are captured by the MMP, as well as the status and performance indicators related to the monitored events and parameters.

Daemon processes that execute on behalf of the DPP, DMP and MMP are activated and remain active during step 34, unless terminated by the system administrator.

During steps 36, 38 and 40, an alarm is generated due to the occurrence of a network event defined by the generation of an alarm by the MMP or requested parameters are derived. They are captured by the MMP. The MMP forwards these data to the DPP daemon process for handling.

In subsequent step 42, the DPP receives the data. It will spawn a subprocess, or a thread, to process the data. The subprocess will determine how to manage the received data and if an alarm should be sent to the DMP. Thus, during step 44, the DPP sends the alarm information to the DMP.

In step 46, the DMP spawns a subprocess or a thread which stores the alarm information in the central data repository (database 13) and then terminates.

During step 48, the DPP invokes the DMP to apply aliasing rules in the PR library 15 to consolidate the alarm with all the active alarms previously received. If this alarm can be correlated with another alarm previously received in the active list, the program branches to step 50 wherein the processing of this alarm is finished and the DPP subprocess is terminated. The DPP daemon may then go into a standby state to await the next set of data to be sent from the MMP.

In the even consolidation during step 48 is not relevant, step 48 branches to step 52 wherein the DPP adds the alarm to the list of active alarms to be resolved. The DPP also invokes the DMP to use the resolution rules in the PR library to search for resolutions to this alarm.

During step 54, the DMP exhausts the search for all resolutions from the PR library. At step 56 the DMP sends a list of resolutions to the DPP which then forwards them to the UPP to display the alarm information and resolutions to a user.

The decision of step 58 follows, wherein a determination is made as to whether the resolutions indicate that an automated procedure should be invoked to resolve the alarm. If the answer is in the affirmative, the program branches to step 60, wherein the DPP is invoked to resolve the alarm. The DPP then generates a message that is connected to the UPP so as to confirm this action taken by the DPP. The DPP subprocess then terminates itself.

If, on the other hand, an automated procedure is not to be followed, the program at step 58 branches to step 62, which requires action on the part of the user. The DPP monitors user action from the UPP. Such action from the UPP will await the DPP which in turn spawns a subprocess to handle the request. The action from the user sends a named alarm and a list of resolutions to the DPP. The DPP matches the named alarm and the one in the list of active alarms maintained by the DPP.

During ensuing step 64, the alarm is deleted from the list of active alarms because it is considered to be resolved.

Finally, at step 66, the DPP invokes the DMP functions to search all the resolutions to the named alarm in the PR library 15. For any resolution that is submitted by the user, but is not in the PR library, DPP invokes DMP to add that resolution to the PR library 15 for that particular type of alarm.

We claim:

1. A data management system for an SS#7 network that contains network elements, including SS#7 nodes and protocol monitoring units (PMUs), and comprising:

interconnection means for connecting data from the network elements to a central relational database for storing the data;

means for storing a problem/resolution library of historical network alarm events and their resolutions;

server means interposed between the central relational data base and the interconnection means and including (a) means for connecting the central relational database to the problem/resolution library for selectively adding an event, derived from the central relational database to the problem/resolution library;

(b) data processing means connected to the central relational database for generating preselected reports from the data derived from the network elements: and first client means connected to the interconnection means for accessing the server means and maintaining the central relational database; and second client means connected to the interconnection means for managing the SS#7 network.

2. The system set forth in claim 1 further comprising workstation means, connected between the network elements and the interconnection means for monitoring the operation of the network elements.

3. A method for intelligently managing data derived from an SS#7 network that contains network elements, including SS#7 nodes, and comprising the steps:

monitoring the network elements of an SS#7 network;

generating data indicative of the monitored network elements;

storing the generated data;

processing the generated data to detect an active alarm condition;

comparing the alarm condition to previously received and stored active alarm data;

during comparing, consolidating an active alarm with all active alarms previously received and terminating further processing of the alarm in the event the alarm is correlated with another active alarm previously received;

and if no consolidation occurs, retrieving possible resolutions of the alarm condition based on stored historical data of previous alarm conditions and their resolutions, determining whether an automated procedure should be invoked to resolve the alarm, and if in the affirmative, resolving the alarm;

and if the aforementioned determining of an automated procedure is negative, pausing to permit non-automated resolution; and updating the problem/resolution library with data relating to the present alarm condition and its ultimate non-automated resolution.

4. The method set forth in claim 3 further comprising the step of presenting a user, during the monitoring step, with a graphical interface that presents data relative to the alarm condition and the resolution to the user.

5. The method set forth in claim 3 further comprising the step of presenting a user, during the monitoring step, with a graphical interface that presents network element data for permitting the user to conduct data management of the network.

6. The method set forth in claim 5 wherein the data management is conducted in at least one of the areas of network performance, configuration, accounting and security.

7. A method for intelligently managing data derived from an SS#7 network that contains network elements, including SS#7 nodes and protocol monitoring units (PMUs), the method including four principal parts including a data processing part (DPP), a database management part (DMP), a monitor management (MMP) part, and a user presentation part (UPP), the method comprising the steps:

initializing a central data repository in a database through the DMP;

initializing a problem/resolution data library (PR library) with problem/resolution rules, through the DMP;

monitoring preselected events and network parameters through the MMP, the occurrence of specified network events triggering the generation of alarms that are captured by the MMP, as well as status and performance indicators related to the monitored events and parameters;

activating daemon processes on behalf of DPP, DMP, and MMP;

capturing, through the MMP, an alarm generated due to the occurrence of a predefined network event;

forwarding of alarm data from the MMP to the DPP daemon process;

as a result of processing by the DPP, determining when an alarm should be sent to the DMP;

selectively sending alarm information from the DPP to the DMP;

the DMP causing the storing of the alarm information in the central data repository database;

the DPP invoking the DMP to search the resolution rules in the PR library for resolutions to the alarm;

sending a list of resolutions from the DMP to the DPP which then forwards them to the UPP to display the alarm information and resolutions to a user.

8. The method set forth in claim 7 together with the steps of:

determining whether an automated procedure should be invoked to resolve the alarm, and if in the affirmative involving the DPP to resolve the alarm and generating a message that is connected to the UPP so as to confirm the action taken by the DPP.

9. The method set forth in claim 7 wherein the DPP invokes the DMP to apply aliasing rules in the PR library to consolidate the alarm with all active alarms previously received after the DMP causes the storing of alarm information in the central data repository database; and terminating further processing of the alarm in the event the alarm is correlated with another active alarm previously received.

10. The method set forth in claim 8, wherein, if an automated procedure is not to be followed, the DPP monitors user action from the UPP;

sending a named alarm from the user and a list of resolutions to the DPP;

matching of the named alarm by the DPP and the one in a list of active alarms maintained by the DPP; and deleting the named alarm from the list of active alarms considered currently resolved.

11. The method set forth in claim 8 further comprising the steps of:

deleting the alarm from a list of active alarms because the alarm is considered to be resolved;

invoking the DMP functions by the DPP to search all the resolutions to the named alarm in the PR library; and for any resolution that is submitted by the user that is not in the PR library, the DPP invoking the DMP to add that resolution to the PR library for that particular type of alarm.

* * * * *